United States Patent Office 3,736,326
Patented May 29, 1973

3,736,326
ISOXAZOLOPYRIDINE CARBOXYLIC
ACIDS AND ESTERS
Theodor Denzel, Nuremberg, and Hans Hoehn, Tegernheim, Germany, assignors to E. R. Squibb & Sons, Inc., Princeton, N.J.
No Drawing. Filed Mar. 29, 1971, Ser. No. 129,199
Int. Cl. C07d 39/00
U.S. Cl. 260—295.5 B            11 Claims

ABSTRACT OF THE DISCLOSURE

New isoxazolo[5,4-b]pyridine-5-carboxylic acids and esters having the general formula

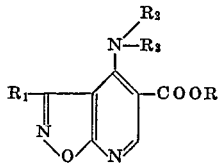

as well as their salts, are useful as central nervous system depressants. These compounds also increase the intracellular concentration of adenosine-3',5'-cyclic monophosphate.

SUMMARY OF THE INVENTION

This invention relates to new isoxazolo[5,4-b]pyridine-5-carboxylic acids and esters, and salts thereof. These new compounds have the general formula (I)

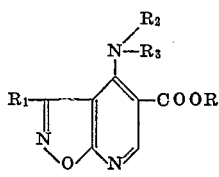

R and $R_1$ each is hydrogen or lower alkyl. The basic nitrogen group

is an acyclic amino moiety wherein $R_2$ and $R_3$ each is hydrogen, lower alkyl, phenyl, substituted phenyl (i.e., the phenyl ring contains one or two simple substituents, e.g., a halogen, preferably chlorine, or trifluoromethyl), phenyl-lower alkylene or di-lower alkylamino-lower alkylene (preferably only one of these).

The basic nitrogen group may also form a heterocycle of 3,5- or 6-members in which an additional nitrogen is present, i.e., the aziridinyl, pyrrolidino, piperidino, pyrazolyl, pyrimidinyl, pyridazinyl or piperazinyl radicals, each of which may also bear as a substituent a hydroxy-lower alkyl group or one or two lower alkyl groups.

DETAILED DESCRIPTION OF THE INVENTION

The symbols have the following meanings in Formula I and throughout this specification.

R and $R_1$ each is hydrogen or lower alkyl. The basic nitrogen group

is an acyclic amino group wherein $R_2$ and $R_3$ each is hydrogen, lower alkyl, phenyl, substituted phenyl (i.e., the phenyl ring contains one or two simple substituents including halogen or trifluoromethyl), phenyl-lower alkylene or di-lower alkylamino-lower alkylene (preferably there is only one of these substituents). This basic group may also form a heterocycle of 3-, 5- o 6-members in which an additional nitrogen is present, in particular, the aziridinyl, pyrrolidino, piperidino, pyrazolyl, pyrimidinyl, pyridazinyl or piperazinyl radicals, each of which may also bear as a substituent a hydroxy-lower alkyl group or one or two lower alkyl groups. That is to say, $R_2$ and $R_3$ each is hydrogen, $R_4,R_5$-phenyl (wherein $R_4$ and $R_5$ each is hydrogen, halogen or trifluoromethyl), phenyl-lower alkylene, or di-lower alkylamino-lower alkylene or $R_2$ and $R_3$ together with the nitrogen to which they are attached form one of the heterocycles mentioned above or the $R_6$-monosubstituted or $R_6R_7$-disubstituted derivative (wherein $R_6$ and $R_7$ are the substituents lower alkyl or hydroxy-lower alkyl in addition to hydrogen).

The lower alkyl and lower alkylene groups in any of the foregoing radicals are straight or branched chain hydrocarbon groups of up to eight carbon atoms like methyl, ethyl, propyl, isopropyl, butyl, t-butyl and the like. The lowest four members are preferred. Benzyl and phenethyl are the preferred phenyl-lower alkylene groups. All four halogens are included, but chlorine is preferred.

The new compounds of Formula I are prepared from compounds of the formula (II)

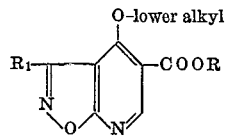

or from compounds of the formula (III)

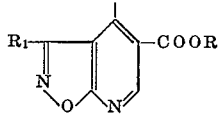

wherein X is chlorine or bromine.

The products of Formula I are then prepared from either of the compounds of Formula II or III by reaction with the appropriate primary or secondary amine of the formula (IV)

This reaction is effected by treating the reactants either at room temperature or at an elevated temperature. In some cases it may be advantageous to make use of an autoclave.

The new compounds of Formula II are formed by the following series of reactions. The symbols in the structure formulas have the same meaning as previously described.

A 5-aminoisoxazole of the formula (V)
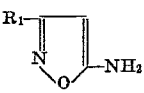

(produced by reacting 3-iminobutyronitrile with hydroxylamine by the procedure described in Ann. Chem. 624, 22 (1959)) is made to react with an alkoxymethylene malonic acid ester of the formula (VI)
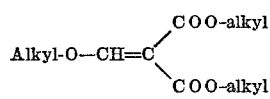

by heating at a temperature of about 120° C.

The resulting compound of the formula (VII)
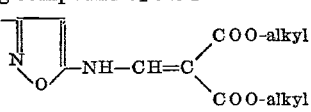

is cyclized in an inert organic solvent, such as diphenyl ether, at about 230° to 260° C. while distilling off the alcohol formed, producing a compound of Formula II with a hydroxy group in the 4-position. This is then alkylated by treatment with an alkyl halide in an inert organic solvent like dimethylformamide in the presence of an alkali metal carbonate to obtain a compound of Formula II.

Alternatively, instead of alkylating the 4-hydroxy compound referred above, this 4-hydroxy compound may be refluxed for several hours with a phosphorus halide like phosphorus oxychloride to obtain the intermediate of Formula III.

Alternatively, instead of cyclization of the malonic acid ethyl ester compound of Formula VII in an inert organic solvent at about 230° to 260° C., this product also undergoes cyclization by means of phosphorus oxychloride producing the intermediate of Formula III.

The compounds of Formula I form salts which are also part of this invention. The salts include acid-addition salts, particularly the non-toxic, physiologically acceptable members. The bases of Formula I form salts by reaction with a variety of inorganic and organic acids providing acid addition salts including, for example, hydrohalides (especially the hydrochloride and hydrobromide), sulfate, nitrate, phosphate, oxalate, tartrate, malate, citrate, picrate, acetate, ascorbate, succinate, arylsulfonates like benzenesulfonate, toluenesulfonate, alkanesulfonates like methanesulfonate, cyclohexanesulfamate, etc. The acid addition salts frequently provide a convenient means for isolating the product, e.g., by forming and precipitating the salt in an appropriate menstruum in which the salt is insoluble, then after separation of the salt, neutralizing with a base such as barium hydroxide or sodium hydroxide, to obtain the free base of Formula I. Other salts may then be formed from the free base by reaction with an equivalent of acid.

The new compounds of this invention are central nervous system depressants and may be used as tranquilizers or ataractic agents for the relief of anxiety and tension states, for example, in mice, cats, rats, dogs and other mammalian species, in the same manner as chlordiazepoxide. For this purpose a compound or mixture of compounds of Formula I, or non-toxic, physiologically acceptable acid addition salt thereof, may be administered orally or parenterally in a conventional dosage form such as tablet, capsule, injectable or the like. A single dose, or preferably 2 to 4 divided daily doses, provided on a basis of about 1 to 50 mg. per kilogram per day, preferably about 2 to 15 mg. per kilogram per day, is appropriate. These may be conventionally formulated in an oral or parenteral dosage form by compounding about 10 to 250 mg. per unit of dosage with conventional vehicle, excipient, binder, preservative, stabilizer, flavor or the like as called for by accepted pharmaceutical practice.

The new compounds also increase the intracellular concentration of adenosine-3',5'-cyclic monophosphate, and thus by the administration of about 1 to 100 mg./kg./day, preferably about 10 to 50 mg./kg., in single or two to four divided doses in conventional oral or parenteral dosage forms such as those described above may be used to alleviate the symptoms of asthma.

The following examples are illustrative of the invention. All temperatures are on the centigrade scale.

EXAMPLE 1

4-n-butylamino-5-ethoxycarbonyl-3-methylisoxazolo [5,4-b]pyridine (a) (3-methyl - 5 - isoxazolyl)aminomethylenemalonic acid diethyl ester.—112.5 g. of 3-methyl-5-aminoisoxazole (1.14 mol.) and 248 g. of ethoxymethylenemalonic acid diethyl ester (1.14 mol.) are heated with stirring for 45 minutes at 130°. After this period, ethanol is removed under reduced pressure. The residue solidifies on cooling and is recrystallized from ethanol, M.P. 134–136°, yield 245 g. (80%).

(b) 5-ethoxycarbonyl-4-hydroxy - 3 - methylisoxazolo [5,4-b]pyridine.—50 g. of (3-methyl-5-isoxazolyl)aminomethylenemalonic acid diethyl ester (0.19 mol.) are quickly added to 250 ml. of vigorously refluxing diphenyl ether. After 7 minutes, the reaction mixture is cooled rapidly. The solvent is distilled off in vacuo and the oily residue crystallizes after adding 100 ml. of methanol. Recrystallization from methanol yields 20 g. (48%) of 5 - ethoxycarbonyl - 4-hydroxy-3-methylisoxazolo[5,4-b] pyridine, M.P. 150–152°.

(c) 4-ethoxy-5-ethoxycarbonyl - 3 - methylisoxazolo [5,4-b]pyridine.—22.2 g. of 5-ethoxycarbonyl-4-hydroxy-3-methylisoxazolo[5,4-b]pyridine (0.1 mol.) are dissolved in 150 ml. of ethanol and 28 g. of potassium carbonate (0.2 mol.) and 31 g. ethyl iodide (0.2 mol.) are added. The mixture is heated, with stirring for 6 hours. The hot solution is filtered and the solvent is evaporated. The oily residue yields on crystallization with methanol 18.2 g. of 4 - ethoxy - 5 - ethoxycarbonyl-3-methylisoxazolo[5,4-b] pyridine (73%), M.P. 62°.

(d) 4-n-butylamino-5-ethoxycarbonyl - 3 - methylisoxazolo[5,4-b]pyridine.—25 g. of 4-ethoxy-5- ethoxycarbonyl-3-mehtylisoxazolo[5,4-b]pyridine (0.113 mol.) are dissolved in 100 ml. of benzene and, after adding 8 g. of n-butylamine (0.23 mol.) is refluxed for 12 hours. The solvent is distilled off and the residual 4-butylamino-5-ethoxycarbonyl-3-methylisoxazolo[5,4-b]pyridine is recrystallized from ligroin, M.P. 60°, yield 23.5 g. (85%).

The hydrochloride of 4-n-butylamino-5-ethoxycarbonyl-3-methylisoxazolo[5,4-b]pyridine is formed by adding to a solution of the above product an alcoholic solution of hydrogen chloride.

EXAMPLES 2–6

50 g. of 5-ethoxycarbonyl-4-hydroxy-3-methylisoxazolo[5,4-b]pyridine (0.225 mol.) in 200 ml. of phosphorus oxychloride are refluxed for 4 hours at 120–130°. After this time, the excess phosphorus oxychloride is removed in vacuo and the residue is carefully neutralized with saturated sodium bicarbonate solution. The 4-chloro-5-ethoxycarbonyl-3-methylisoxazolo[5,4-b]pyridine is extracted 3 times with 100 ml. of chloroform. The organic layer is separated and dried over sodium sulfate, evaporated to dryness and the solid residue is recrystallized from ethanol, M.P. 92–94°, yield 36 g. (66%).

24 g. of 4-chloro-5-ethoxycarbonyl-3-methylisoxazolo [5,4-b]pyridine (0.1 mol.) in 100 ml. tetrahydrofurane are added dropwise to a 100 ml. solution containing 0.1 mol. of amine. After adding, the mixture is refluxed for two hours with continuous stirring. On cooling to room temperature and on adding 200 ml. of ether a white precipitate forms and is filtered off. The filtrate is evaporated to dryness and the residual 4-substituted-5-ethoxycarbonyl-3-methylisoxazolo[5,4-b]pyridine is recrystallized.

The following compounds are produced by the above procedure utilizing the appropriate amine:

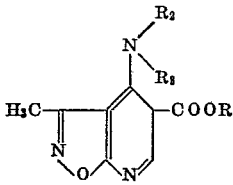

| Example | $R_2$ | $R_3$ | R | M.P., deg. | Yield, percent |
|---|---|---|---|---|---|
| 2 | —$CH_3$ | $CH_3$— | —$C_3H_5$ | 139 | 70 |
| 3 | (CF₃-phenyl) | H | —$C_2H_5$ | 138–140 | 59 |
| 4 | (dichlorophenyl) | H | —$C_2H_5$ | 92–93 | 33 |
| 5 | (phenyl) | H | —H | 259 | 89 |
| 6 | —(CH₂)₃—N(CH₃)₂ | $CH_3$ | H | —$C_2H_5$ | 154–156 | 68 |

EXAMPLE 7

4-anilino-5-carboxy-3-methylisoxazolo[5,4-b]pyridine 5 g. (0.0168 mol.) of 4-anilino-5-ethoxycarbonyl-3-methylisoxazolo[5,4-b]pyridine (prepared by the procedure given in Example 1d utilizing aniline in place of butylamine) are treated with stirring, with 2 g. of potassium hydroxide (0.035 mol.) in 30 ml. of ethanol for 10 hours at 40°. The solvent is removed by distillation and the residue is dissolved in 10 ml. of water. The 4-anilino-5-carboxy-3-methylisoxazolo[5,4-b]pyridine precipitates on acidifying the solution with acetic acid. Recrystallization from acetic acid yields 4 g. (83%), M.P. 261°.

The following additional products are produced by substituting 5-aminoisoxazole or another 3-substituted analog for the 3-methyl-5-aminoisoxazole in part a or the appropriate amine for butylamine in part d of Example 1, respectively:

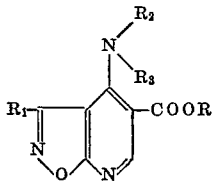

| Example | R | $R_1$ | $R_2$ / $R_3$ (N) |
|---|---|---|---|
| 8 | $C_2H_5$ | H | —$NH_2$ |
| 9 | $C_2H_5$ | $C_2H_5$ | —N($C_2H_5$)₂ |
| 10 | H | $CH_3$ | —N($CH_3$)₂ |
| 11 | $CH_3$ | $CH_3$ | —N($C_5H_{11}$)₂ |

TABLE—Continued

| Example | R | $R_1$ | $N(R_2)(R_3)$ |
|---|---|---|---|
| 12 | $CH_3$ | $CH_3$ | —NH—$C_6H_5$ |
| 13 | H | H | —N(piperidino) |
| 14 | H | $CH_3$ | —N(piperidino) |
| 15 | $CH_3$ | $CH_3$ | —N(piperazino) |
| 16 | $C_2H_5$ | $CH_3$ | —N(pyrrolidino type) |
| 17 | $C_2H_5$ | $CH_3$ | —N(N-hydroxyethyl piperazino)—$NC_2H_4OH$ |
| 18 | H | H | —$NHCH_3$ |
| 19 | H | $C_2H_5$ | —N(H)—$C_2H_4N(C_2H_5)_2$ |
| 20 | $C_2H_5$ | H | —$NHCN_2CH_2$—(phenyl) |
| 21 | $C_2H_5$ | H | —N(CH₃)(CH₃) aziridinyl-dimethyl |
| 22 | $C_2H_5$ | H | —N aziridinyl-CH₃ |

What is claimed is:

1. A compound of the formula

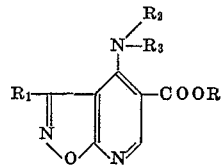

wherein R and $R_1$ each is hydrogen or lower alkyl, $R_2$ and $R_3$ each is hydrogen, lower alkyl, $R_4$, or one of said terms is $R_5$-phenyl, phenyl-lower alkylene, di-lower alkylamino-lower alkylene or $R_2$ and $R_3$ together with the nitrogen to which they are attached form one of the heterocyclics $R_6$, $R_7$-aziridinyl, $R_6$, $R_7$-pyrrolidino, $R_4$ is hydrogen, $R_5$ is hydrogen, halogen or trifluoromethyl, and $R_6$ and $R_7$ each is hydrogen or lower alkyl providing that only one R is a phenyl-containing substituent, and physiologically acceptable acid addition salts thereof.

2. A compound as in claim 1 wherein R, $R_1$, $R_2$ and $R_3$ each is lower alkyl.

3. A compound as in claim 1 wherein $R_2$ is hydrogen, and R, $R_1$ and $R_3$ each is lower alkyl.

4. A compound as in claim 3 wherein R is ethyl, $R_1$ is methyl and $R_3$ is butyl.

5. The acid addition salt of a compound of claim 4.

6. A compound as in claim 1 wherein R and $R_2$ each is hydrogen, $R_1$ is methyl and $R_3$ is phenyl.

7. A compound as in claim 1 wherein R is ethyl, $R_1$ is methyl, $R_3$ is hydrogen and $R_2$ is (trifluoromethyl)phenyl.

8. A compound as in claim 1 wherein R is ethyl, $R_1$ is methyl, $R_2$ is dichlorophenyl and $R_3$ is hydrogen.

9. A compound as in claim 1 wherein R is ethyl, $R_1$ is methyl, $R_2$ is di(lower alkyl)amino(lower alkylene) and $R_3$ is hydrogen.

10. A compound as in claim 9 wherein the $R_2$ group is dimethylaminopropyl.

11. A compound as in claim 1 wherein R and $R_1$ each is hydrogen and the group
is pyrrolidino.
References Cited
UNITED STATES PATENTS
3,669,950   6/1972   Hoehn et al. ----- 260—295.5 B
OTHER REFERENCES
Roberts et al., Basic Principles of Organic Chemistry, Benjamin Publishers, pp. 661, 664 and 806; QD 251 R58 C.6 (1965).
ALAN L. ROTMAN, Primary Examiner
U.S. Cl. X.R.
260—250 A, 268 BC, 256.4 R, 293.58, 294.8 C; 424—250, 251, 266, 267